(12) United States Patent
Shatzkamer et al.

(10) Patent No.: US 8,356,171 B2
(45) Date of Patent: Jan. 15, 2013

(54) SYSTEM AND METHOD FOR IMPLEMENTING FAST REAUTHENTICATION

(75) Inventors: Kevin Shatzkamer, New York, NY (US); Anand K. Oswal, Sunnyvale, CA (US); Mark Grayson, Maidenhead (GB); Jayaraman Iyer, Sunnyvale, CA (US); Navan Narang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1405 days.

(21) Appl. No.: 11/411,482

(22) Filed: Apr. 26, 2006

(65) Prior Publication Data
US 2007/0256120 A1 Nov. 1, 2007

(51) Int. Cl.
*G06F 21/00* (2006.01)
(52) U.S. Cl. ............... 713/155; 726/5; 726/12; 726/22; 713/193; 380/229; 380/281; 455/411; 705/44; 709/203; 709/229
(58) Field of Classification Search .............. 726/12, 726/15; 713/155
See application file for complete search history.

(56) References Cited

U.S. PATENT DOCUMENTS

| 5,862,481 | A | 1/1999 | Iskra et al. |
| 6,332,077 | B1 | 12/2001 | Wu et al. |
| 6,782,260 | B2 | 8/2004 | Nakakita |
| 7,206,826 | B1 * | 4/2007 | Parker et al. .................. 709/220 |
| 7,237,261 | B1 * | 6/2007 | Huber et al. .................... 726/12 |
| 7,249,177 | B1 * | 7/2007 | Miller ........................... 709/225 |
| 7,418,596 | B1 * | 8/2008 | Carroll et al. ................. 713/169 |
| 7,503,065 | B1 * | 3/2009 | Packingham et al. ........... 726/12 |
| 7,512,796 | B2 * | 3/2009 | Haverinen et al. ............. 713/168 |
| 7,930,753 | B2 * | 4/2011 | Mellinger et al. ............... 726/26 |
| 2002/0012433 | A1 * | 1/2002 | Haverinen et al. ............. 380/247 |
| 2002/0138551 | A1 * | 9/2002 | Erickson ....................... 709/203 |
| 2003/0016803 | A1 * | 1/2003 | Schmid et al. ............ 379/201.01 |
| 2003/0061503 | A1 * | 3/2003 | Katz et al. ..................... 713/200 |
| 2004/0073445 | A1 * | 4/2004 | Mellinger et al. ................. 705/1 |
| 2004/0081118 | A1 * | 4/2004 | Mukherjee et al. ........... 370/328 |

(Continued)

FOREIGN PATENT DOCUMENTS
AU 203290841 A1 11/2003
(Continued)

OTHER PUBLICATIONS

Kassab et al., "Fast Pre-Authentication Based on Proactive Key Distribution for 802.11 Infrastructure Networks", WMuNeP'05, Oct. 13, 2005, Montreal, Quebec, Canada.*

(Continued)

*Primary Examiner* — Morshed Mehedi
(74) *Attorney, Agent, or Firm* — Patent Capital Group

(57) ABSTRACT

A system for efficiently reauthenticating a client of a network. In a specific embodiment, the system includes an authentication server and a Security GateWay (SGW) in communication with the client. The SGW includes reauthentication information associated with the client. In a more specific embodiment, the authentication server includes an Authentication, Authorization, and Accounting (AAA) server. The SGW further includes one or more routines for employing the reauthentication information to reauthenticate the client. The AAA server performs initial authentication of the client to enable client access to the network, which yields the reauthentication information. The reauthentication information includes one or more keys and/or counters, such as an authorization key, an encryption key, and a master key, which is/are predetermined by the AAA server.

21 Claims, 3 Drawing Sheets

U.S. PATENT DOCUMENTS

| | | | |
|---|---|---|---|
| 2004/0098586 A1 | 5/2004 | Rebo et al. | |
| 2004/0098627 A1* | 5/2004 | Larsen | 713/202 |
| 2004/0148504 A1* | 7/2004 | Forsberg | 713/168 |
| 2004/0168054 A1* | 8/2004 | Halasz et al. | 713/155 |
| 2004/0221154 A1* | 11/2004 | Aggarwal | 713/151 |
| 2004/0268121 A1* | 12/2004 | Shelest et al. | 713/156 |
| 2005/0124288 A1* | 6/2005 | Karmi et al. | 455/3.01 |
| 2005/0163078 A1* | 7/2005 | Oba et al. | 370/331 |
| 2005/0177723 A1* | 8/2005 | Huang et al. | 713/168 |
| 2005/0246445 A1 | 11/2005 | Panasyuk et al. | |
| 2005/0267974 A1 | 12/2005 | Panasyuk et al. | |
| 2005/0273513 A1* | 12/2005 | Panasyuk et al. | 709/228 |
| 2006/0172732 A1* | 8/2006 | Nylander et al. | 455/433 |
| 2006/0185013 A1* | 8/2006 | Oyama et al. | 726/21 |
| 2006/0223497 A1* | 10/2006 | Gallagher et al. | 455/410 |
| 2008/0119184 A1 | 5/2008 | Rebo | |
| 2008/0229416 A1* | 9/2008 | Stewart et al. | 726/22 |
| 2008/0301790 A1 | 12/2008 | Halasz et al. | |

FOREIGN PATENT DOCUMENTS

| | | |
|---|---|---|
| CN | 101432717 | 5/2009 |
| EP | 1597866 A1 | 11/2005 |
| EP | 1597866 B1 | 11/2005 |
| EP | 2011270 | 4/2007 |
| EP | 07755042 | 1/2009 |
| EP | 1561331 A2 | 6/2009 |
| EP | 1561331 B1 | 6/2009 |
| WO | WO 01/39538 A1 | 5/2001 |
| WO | WO 01/78351 A2 | 10/2001 |
| WO | WO 02/21768 A2 | 3/2002 |
| WO | WO 02/21768 A3 | 6/2003 |
| WO | WO 2004/047397 A2 | 6/2004 |
| WO | WO 2004/047397 A3 | 6/2004 |
| WO | WO 2004/077750 A1 | 9/2004 |
| WO | WO 2007/127035 A2 | 11/2007 |
| WO | WO 2007/127035 A3 | 11/2007 |

OTHER PUBLICATIONS

Haverinen, Henry, et al.; "Cellular Access Control and Charging for Mobile Operator Wireless Local Area Networks", IEEE Wireless Communications, vol. 9, No. 6, Dec. 1, 2002; pp. 52-60.

Haverinen, H., et al., "Extensible Authentication Protocol Method for GSM Subscriber Identity Modules (EAP-SIM)," Network Working Group, Internet-Draft, Dec. 21, 2004; 92 pages; http://tools.ietf.org/html/draft-haverinen-pppext-eap-sim-16.

Bharghavan, V., "Secure Wireless LANs," $2^{nd}$ ACM Conference on Computer and Communications Security, Nov. 2, 1994, XP002155490, pp. 10-17 http://www.cs.wichita.edu/~chang/lecture/cs843/sp2002/paper/p10-bharghavan.pdf.

EPO Communication (1 page), Supplementary European Search Report (2 pages) and Written Opinion (3 pages) for European Patent Application 07755042.4, Jan. 6, 2010.

PCT International Preliminary Report on Patentability (1 page) and Written Opinion of the International Searching Authority (5 pages) mailed Sep. 23, 2008 for International Application No. PCT/US07/008632 (published as WO 2007/127035).

PCT International Search Report mailed Aug. 4, 2004 for PCT/US2004/004998 (published as WO 2004/077750), 3 pages.

PCT International Search Report mailed Jun. 23, 2004 for PCT/US2003/036291 (published as WO 2004/047397 A3), 3 pages.

PCT International Search Report mailed Sep. 23, 2008 for International Application No. PCT/US07/008632 (published as WO 2007/127035); 1 page.

China—The First Office Action, Date of Issue Mar. 3, 2010 for Application No. 200780015228.6, 18 pages.

PRC Aug. 12, 2010 Response to First Chinese Office Action for Application No. 200780015228.6 [English Translation of Pending Claims only]; 24 pages.

"UMA Architecture (Stage 2), Unlicensed Mobile Access (UMA); Architecture (Stage 2)", Aquired at: http://kom.aau.dk/~ff/UMA/Stage2.pdf, 80 pages, 2004 Alcatel, At&t Wireless Services.

UMA Technology, Aquired at: http://www.umatechnology.org/technology/index.htm, 2 pages, 2004-2005.

* cited by examiner

SYSTEM AND METHOD FOR IMPLEMENTING FAST REAUTHENTICATION

BACKGROUND OF THE INVENTION

This invention is related in general to networks and more specifically relates to systems and methods for enhancing network authentication functionality for authenticating and reauthenticating network clients.

Systems and methods for authenticating and reauthenticating network clients are employed in various demanding applications including cellular networks, WiFi networks (e.g. IEEE 802.11 networks), Unlicensed Mobile Access (UMA) or Generic Access Networks (GANs), combinations thereof, and so on. Such networks often service clients, such as wireless phones or portable computers, called mobile stations. The mobile stations are first authenticated to ensure they are genuine and then authorized in order to verify what network services, if any, the clients are allowed to employ or capable of employing. Reauthentication is often performed when a wireless phone or other client momentarily looses the connection to the network, or when a validity period of previous credentials has expired.

Cellular, WiFi, and UMA or GAN networks often employ one or more Authentication, Authorization, and Accounting (AAA) servers in communication with one or more Home Location Registers (HLRs) to facilitate client authentication and reauthentication. The HLR often maintains information pertaining to clients, also called subscribers, including International Mobile Subscriber Identity (IMSI) numbers, current location, subscribed services, and so on. The AAA server may facilitate retrieving identification information from a client of the IP network and comparing the retrieved identification information with corresponding records in the HLR to determine whether to authorize the client to use certain network services.

Authentication processes are often relatively time-consuming and resource-intensive, consuming network resources at the AAA server and the HLR. Consequently in certain situations, such as when a client network connection is lost, more efficient reauthentication techniques are employed to reauthenticate a client.

An AAA server often communicates encrypted reauthentication information to a mobile station via an associated GAN or UMA within a RADIUS Extensible Authentication Protocol (EAP)—Subscriber Identity Module (EAP-SIM) message. If the mobile station loses a connection with the GAN or UMA, the mobile station may employ the reauthentication information to reauthenticate relatively quickly if done so within a predetermined time interval. Unfortunately, existing systems and methods for implementing reauthentication remain undesirably time consuming and network-resource intensive.

DETAILED DESCRIPTION OF EMBODIMENTS OF THE INVENTION

A preferred embodiment of the present invention implements a system and method for facilitating fast reauthentication of a network client. The system includes a cache in a Security GateWay (SGW) that stores reauthentication information obtained from an authentication server. The SGW implements one or more routines for employing the reauthentication information to perform fast reauthentication of a client without requiring additional signaling between the SGW and the authentication server. In a more specific embodiment, the network includes an Unlicensed Mobile Access (UMA) Network, a Generic Access Network (GAN), and/or a Public Wireless Local Area Network (PWLAN). The authentication server includes an Authentication, Authorization, and Accounting (AAA) server. The AAA server may communicate the authentication information to the SGW, including permission rights, to allow the SGW to perform autonomous very fast reauthentication before very fast reauthentication is performed by the SGW.

For the purposes of the present discussion, an SGW may be any network entity, such as a hardware or software module or program, that may facilitate maintaining a secure or otherwise encrypted connection between network entities.

Authentication or reauthentication information may be any information that may be employed to determine if a client or other network entity is authorized to access a network or otherwise employ certain services thereof.

For the purposes of the present discussion, an authentication server, such as an AAA server, may be any server that is adapted to implement authentication functions to authenticate or authorize a network entity, such as a client, to use certain services provided by the network. Authentication functions may include tracking network service usage by a client, maintaining billing information for services used by a client, and so on. A server may be any computer program, which may be implemented in hardware and/or software, that can provide data and/or functions to another network entity, such as another program or module, in response to a query from the other program or module or via a push to the other program or module. An AAA server may be any authentication server that may authenticate a client and also authorize a client to use a given network service or functionality and to account for or to otherwise quantify services used by the client.

For clarity, various well-known components, such as power supplies, modems, firewalls, network cards, Internet Service Providers (ISPs), Internet Protocol SECurity (IP-SEC) concentrators, Media GateWays (MGWs), Mobile Switching Centers (MSCs), load balancers, and so on, have been omitted from the figures. However, those skilled in the art with access to the present teachings will know which components to implement and how to implement them to meet the needs of a given application.

Figure 1:
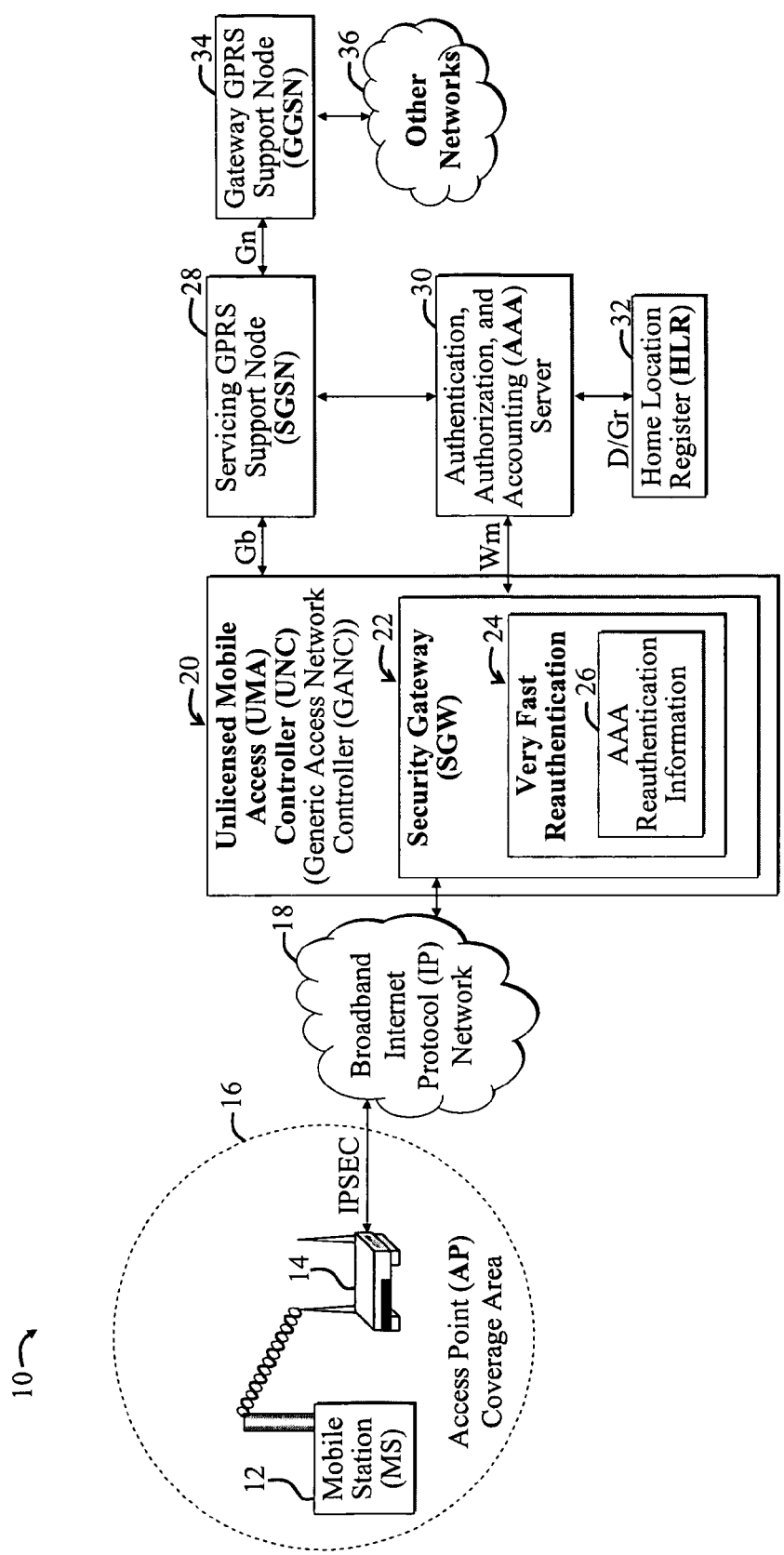
FIG. 1 is a diagram illustrating a UMA network employing a Security GateWay (SGW) and an Authentication, Authorization, and Accounting (AAA) server, which are adapted to implement very fast reauthorization according to an embodiment of the present invention.

FIG. 1 is a diagram illustrating a UMA network 10 employing an SGW 22 and an AAA server 30, which are adapted to implement fast reauthorization according to an embodiment of the present invention. The network 10 includes a mobile station 12 in wireless communication with an Access Point 14, which is associated with a coverage area 16 within which the mobile station 12 is located.

The mobile station 12 may be any device that can communicate wirelessly with a network. Examples of mobile stations include wireless phones, laptops with IEEE 802.11 wireless cards, Bluetooth-enabled devices, other wireless clients, and so on. The AP 14 may be an IEEE 802.11a, 802.11b, 802.11g, 802.16, Infrared, Bluetooth, or other type of AP that facilitates connecting the mobile station 12 to the network 10. For the purposes of the present discussion, the mobile station 12 is a client of the network 10. A client may be any device that derives a service, data, or other information from a network or server.

The AP 14 is coupled to the SGW 22 via a broadband Internet Protocol (IP) network 18 through which an IP SECurity (IPSEC) tunnel is established. The IPSEC tunnel originates at the client 12 and extends to the SGW 22, which is incorporated within a UMA Network Controller (UNC) 20. The UNC 20 may be called by another name, such as Generic Access Network Controller (GANC). Those skilled in the art will appreciate that in different implementations, network components, such as controllers, may be called by different names.

The SGW 22 includes a very fast reauthentication module 24, which includes reauthentication information 26 obtained via the AAA server 30. The authentication information 26 facilitates enabling the very fast reauthentication module 24 to fast reauthorizations as discussed more fully below. The AAA server 30 may maintain the authentication information in a Home Location Register 32 that is coupled to the AAA server 30.

While the very fast reauthentication module 24 is shown implemented within the SGW 22, the very fast reauthentication module 24 may be a separate module that is coupled to the SGW 22 without departing from the scope of the present invention. Furthermore, the SGW 22 need not be integrated within the UNC 20, but may be implemented as a separate module that is coupled to the UNC 20.

A Servicing GPRS (General Packet Radio Services) Support Node (SGSN) 28 is coupled to the UNC 20, the AAA server 30, and a Gateway GPRS Support Node (GGSN) 34. The GGSN 34 is coupled to other networks 36, such as the Internet, Global System for Mobile communications (GSM) networks, Code Division Multiple Access (CDMA) networks, and so on.

In operation, the mobile station 12 initiates communications with the SGW 22, which subsequently results in the establishment of the IPSEC tunnel between the mobile station 12 and the SGW 22 of the UNC 20. Before the mobile station 12 is allowed by the UNC 20 to access various services offered via the UMA network 10, the mobile station 12 is first authenticated by the AAA server 30.

In the present specific embodiment, the AAA server 30 employs Extensible Authentication Protocol—Subscriber Identity Module (EAP-SIM) authentication methods for GSM SIMs. The AAA server 30 employs the well-known A3/A8 authentication algorithm or variation thereof to facilitate initially authenticating the mobile station 12.

For the purposes of the present discussion, to authenticate a client may mean to identify the client and verify that the client has a connection with a valid Subscriber Identity Module (SIM) card and verify or otherwise determine if the client may access certain network services. In some applications, a client may be authenticated without determining if the client has a connection with a valid SIM card. Network services may be any functionality usable by a network entity, such as a client. Examples of network services include Short Message Service (SMS) or Voice Over Internet Protocol (VOIP) functionality.

The initial authentication may require various signaling between the SGW 22, the HLR 32, and the AAA server 30.

After performing initial authentication of the mobile station 12, the AAA server 30 will have obtained various authentication information. The obtained authentication information may be provided to SGW 22 as an indication of permission to perform very fast reauthentication for the authenticated mobile station 12. The authentication information may be cached at the SGW 22 as the reauthentication information 26. The reauthentication information 26, which pertains to the mobile station 12, may contain various information, such as an International Mobile Subscriber Identity (IMSI) or a pseudo IMSI, capabilities of the mobile station 12, information identifying services that the mobile station 12 is subscribed to or otherwise authorized to access, and so on.

Conventionally, when the mobile station 12 momentarily exits the network coverage area 16, or when the mobile station 12 momentarily looses the IPSEC connection with the SGW 22, or when the mobile station 12 otherwise momentarily losses the Transmission Control Protocol (TCP) connection with the UNC 20, the AAA server 30 facilitates reauthentication. Existing reauthentication methods, such as those often employed by public WiFi networks, typically do not involve the reuse of the A3/A8 algorithm. However, such reauthentication methods typically still require excessive communications between the AAA server 30 and the SGW 22. Excessive reauthentications may overwhelm an HLR, an AAA server, and/or the communications paths between the HLR, the AAA server, and an accompanying SGW.

The network 10 of FIG. 1 is efficiently adapted to substantially obviate or reduce communications between the AAA server 30, the SGW 22, and the HLR 32 during reauthentication, called vary fast reauthentication herein.

To facilitate very fast reauthentication of a client, the very fast reauthentication module 24 running on the SGW 22 is adapted to employ the reauthentication information 26. In the present specific embodiment, very fast reauthentication requires no communication between the SGW 22 and the AAA server 30 during reauthentication. However certain implementations may employ minimal communication between the SGW 22 and the AAA server 30 without departing from the scope of the present invention.

In the present specific embodiment, the AAA server 30 runs one or more routines for forwarding the reauthentication information 26 to the SGW 22, after the reauthentication information is initially determined by the AAA server 30, which may occur during original authentication of the mobile station 12. The reauthentication information passed from the AAA server 30 to the SGW 22 may be embedded in an original authentication response message. The very fast reauthentication module 24 may represent offloaded reauthentication functionality that has been offloaded from the AAA server 30 to the SGW 22 to expedite reauthentication, thereby potentially relieving potential network congestion caused by reauthentication requests handled by the AAA server 30.

Functionality is said to be offloaded form a first device to a second device when the functionality is copied, moved, or otherwise implemented or approximated in the second device. Those skilled in the art with access to the present teachings may readily offload, copy, or otherwise transport fast reauthentication functionality from the AAA server 30 to the SGW 22 to implement an embodiment of the present invention without undue experimentation.

For the purposes of the present discussion, the offloaded reauthentication information 26 may include pseudo-imsi@domain, and optionally, user password information. In certain implementations, the reauthentication information 26 may include various reusable keys that may be reused each time the mobile station 12 is authenticated or reauthenticated.

The keys may include an authorization key (K_auth), an encryption key (K_encr), and a master key, which have been previously derived by the AAA server 30. The authentication information may further include a counter (AT_COUNTER) that may provide additional keying information, an upper limit to the number of successive fast reauthentication attempts or successes allowed by the network 10 for the mobile station 12, protection information, and so on. Note that in the present embodiment, very fast reauthentication does not require rerunning of the A3/A8 algorithm. In certain implementations, the reauthentication information 26 includes only pseudo-imsi@domain information.

The AAA server 30 optionally provides new fast reauthentication identity information for the mobile station 12 along with the reauthentication information 26. Reauthentication identity information may be any number or other identifier or combination thereof that is assigned to a client, such as a mobile station, for the purposes of implementing reauthentication.

In the present specific embodiment, all information communicated between the AAA server 30 and the mobile station 12 is encrypted by the AAA server 30, the SGW 22, and/or the mobile station 12. This prevents intermediate devices, such as devices forming the broadband IP network 18, from snooping or otherwise intercepting the information.

Hence, the network 10 employs a system, which may be implemented via the SGW 22 and the AAA Server 30, for selectively offloading fast reauthentication functionality from the AAA server 30 to the SGW 22, thereby yielding very fast authentication functionality.

While the present embodiment is discussed with respect to an exemplary UMA network, embodiments of the present invention may be adapted for use with other types of networks without departing from the scope of the present invention. For example, embodiments of the present invention are readily adaptable to Public Wireless Local Area Networks (PW-LANs). In a PWLAN, the very fast reauthentication module 24 may be implemented in a Cisco Access Zone Router (AZR) or Network Access Server (NAS) of the PWLAN.

Those skilled in the art may readily obtain or otherwise construct the various modules of FIG. 1 without undue experimentation. For example, the SGW 22 may be implemented via a modified Cisco SGW. Relevant AAA class attributes and other authentication/reauthentication information may be stored in a Cisco Access Register in the Cisco SGW.

Hence, passing mobile station authorization credentials, such as reauthentication information, from the AAA server 30 and/or HLR 32, to the SGW 22, may enable the SGW 22 to implement very fast reauthorization in response to reauthorization requests received from the mobile station 12 (or elsewhere) without involving the AAA server 30 during reauthentication. Consequently, this improved very fast reauthentication may lower latency and improve handovers between network coverage areas when reauthentication is required for the handovers.

Figure 2:
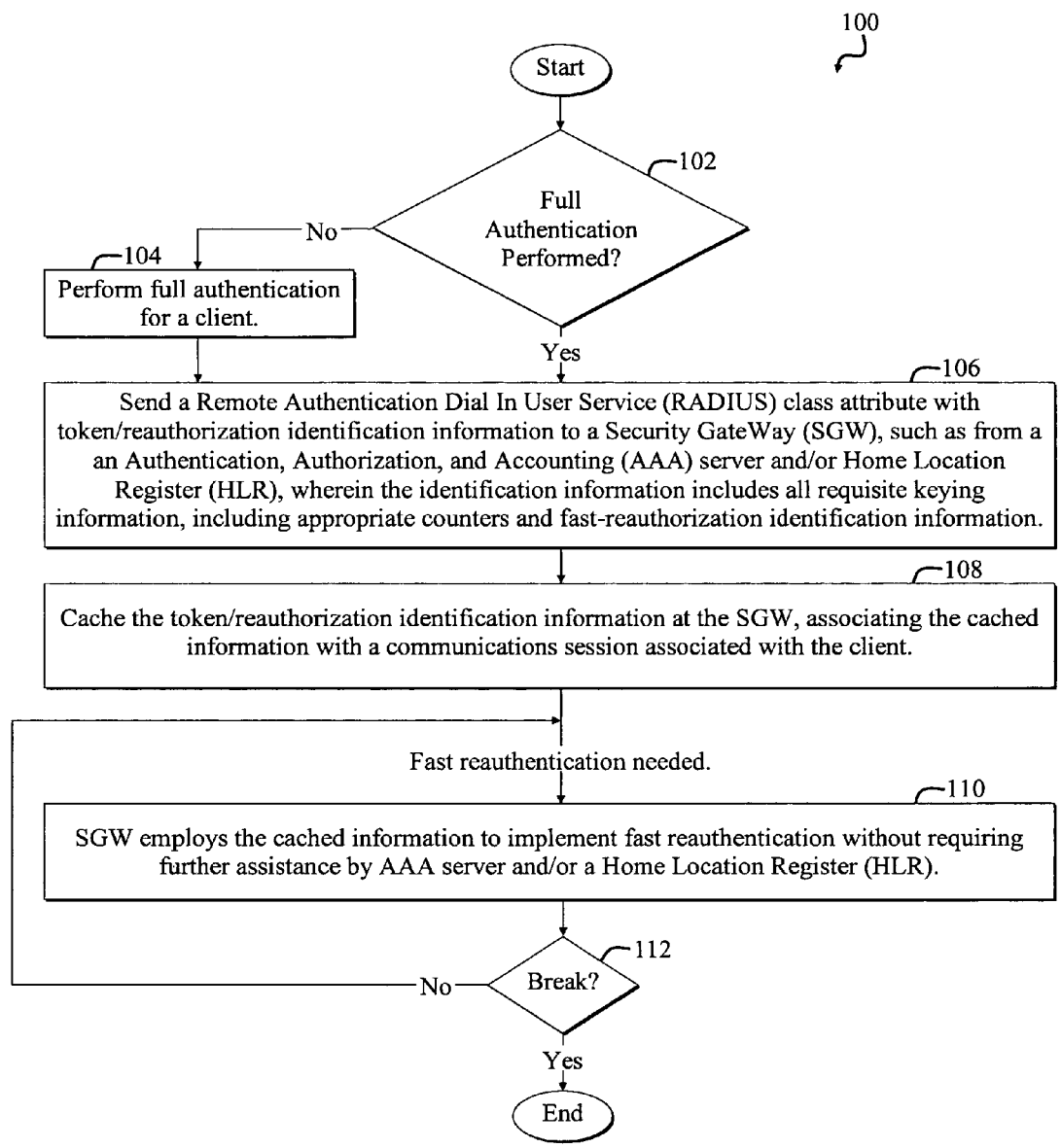
FIG. 2 is a flow diagram of a first method adapted for use with the network of FIG. 1.

FIG. 2 is a flow diagram of a first method 100 adapted for use with the network 10 of FIG. 1. The method 100 includes an initial authentication-checking step 102, wherein the method 100 determines whether a mobile station has been initially authenticated, such as by an AAA server via an A3/A8 algorithm.

If the mobile station has been authenticated, then an information-sending step 106 is performed. Otherwise, an authentication step 104 is performed, wherein the mobile station is initially authenticated.

The information-sending step 106 involves sending authentication information from an AAA server and/or HLR to an SGW that is handling communications with the mobile station. For the purposes of the present discussion, the terms authentication information and reauthentication information may be employed interchangeably. However, reauthentication may be considered a subset or a superset of authentication information without departing from the scope of the present invention. For example, reauthentication information may include additional information over that which is used for initial authentication. The additional information, such as a fast-reauthentication identity, may be employed specifically for reauthentication.

The reauthentication information may include a Remote Authentication Dial In User Service (RADIUS) class attribute with token/reauthorization identification, all requisite keying information, including appropriate counter, fast-reauthorization-identification information, and so on. Exact details as to what is included in reauthentication information are application specific and may be varied without departing from the scope of the present invention.

Subsequently, a caching step 108 involves caching the reauthentication information in the SGW. The reauthentication information, including the token/reauthorization identification information, is associated with a communications session that is associated with mobile station to be reauthenticated as needed.

After fast reauthentication is needed, such as in response to a reauthentication requested received from the mobile station, the SGW employs the cached reauthentication information to implement very fast reauthentication without requiring further assistance by a AAA server and/or a HLR to implement the very fast reauthentication.

Next, a break-checking step 112 determines whether a system break has occurred. A system break may occur when the associated network is disabled or software and/or hardware implementing the method 100 is disabled or otherwise halted. If a system break has occurred, the method 100 completes, otherwise, step 110 continues for the mobile station associated with the cached authentication information.

Various steps 102-112 of the method 100 may be altered, interchanged, and/or omitted without departing from the scope of the present invention. For example, the method 100 may be replaced or used in combination with a more generalized method as discussed more fully below.

Figure 3:
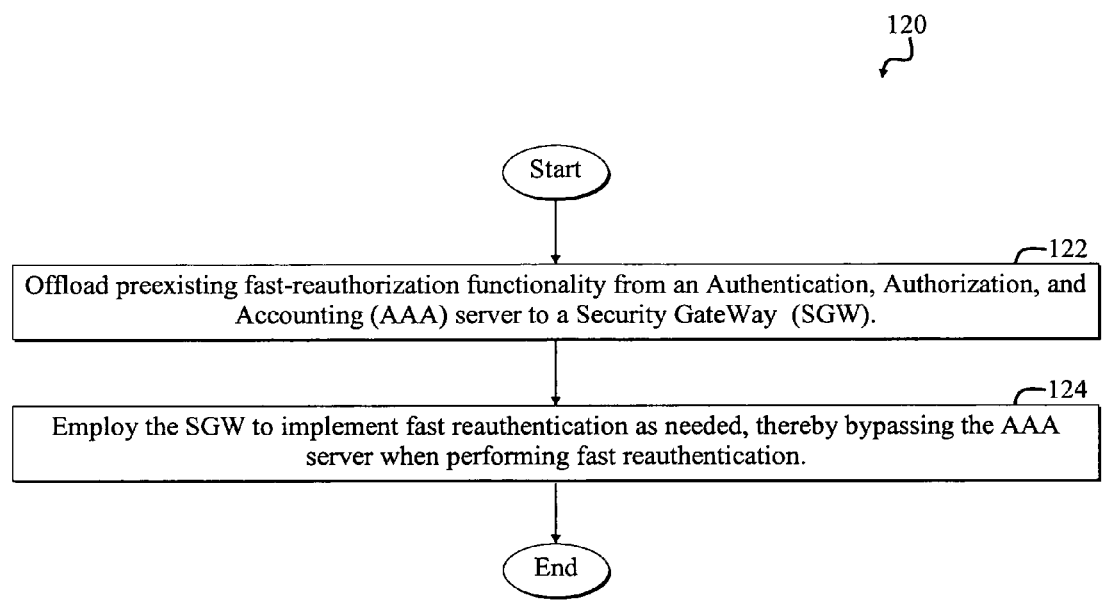
FIG. 3 is a flow diagram of a second method adapted for use with the network of FIG. 1.

FIG. 3 is a flow diagram of a second method 120 that is adapted for use with the network 10 of FIG. 1. The second method 120 may be considered as a more generalized version of the first method 100 of FIG. 2. The method 120 includes an initial offloading step 122, which includes offloading preexisting fast-reauthentication functionality from a AAA server to a SGW in a UMA, GAN, or PWLAN.

Subsequently, the SGW is selectively employed to implement very fast reauthentication while not requiring the retrieval of authentication information from the AAA server during the very fast reauthentication.

Some authentication information and functions may be left to an AAA server when performing fast reauthentication without departing from the scope of the present invention. However, offloading at least some fast-reauthentication functionality and/or predetermined reauthentication information to an SGW before reauthentication functions are performed by the SGW may facilitate relieving network congestion between the AAA server, and SGW that is caused by reauthentication requests from plural clients.

Since the accompanying SGW receives reauthentication requests from clients via IPSEC messages, implementing at least some reauthentication functionality at the SGW may reduce message flows when fast reauthentication is requested by a client. Hence, certain embodiments of the present invention may enable reduction and optimization of message flows during fast reauthentication of EAP-SIM clients. This fast reauthentication may be employed in AZRs of PWLANs, in SGWs of UMAs and GANs, and related networks.

Although embodiments of the invention are discussed primarily with respect to networks employing wireless unlicensed spectrum, embodiments of the present invention may be adapted to any network modules that ordinarily exhibit one type of communication link but would benefit by employing selectively offloaded reauthentication functionality and/or information in accordance with embodiments disclosed therein. Furthermore, any acceptable architecture, topology, protocols, or other network and digital processing features can be employed. In general, network modules, such as access points, endpoints, and so on, can be implemented via any device with processing ability or other requisite functionality.

Although processes of the present invention and the hardware executing the processes may be characterized by language common to a discussion of the Internet and UMA or GAN networks (e.g., "client," "UNC," "GANC," etc.), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
an authentication server that includes a processor and a memory and that is configured to perform an initial authentication of a mobile station, and to provide reauthentication information associated with the mobile station, wherein the initial authentication is performed using an A3/A8 algorithm routine, and wherein the reauthentication information comprises an authorization key, an encryption key, a master key, pseudo International Mobile Scriber Identity (IMSI) information, and an authorization counter, which is configured for identifying an upper limit of successive attempts by the mobile station to employ fast reauthentication within a predetermined time interval; and
a security gateway that includes a processor and a memory and that is configured to provide an encrypted link with both the mobile station and the authentication server, wherein the security gateway is configured to cache and to use the reauthentication information previously received from the authentication server to perform a subsequent fast reauthentication of the mobile station in response to a request via an Internet protocol security (IPSec) tunnel, the fast reauthentication being performed by the security gateway without communicating with the authentication server, and without using the A3/A8 algorithm routine.

2. The system of claim 1, wherein the reauthentication information further comprises additional information over information used in the initial authorization.

3. The system of claim 1, wherein the authentication server comprises an Authentication, Authorization, and Accounting (AAA) server.

4. The system of claim 1, wherein the security gateway comprises a cache memory for storing the reauthentication information.

5. The system of claim 1, wherein the security gateway is adapted to manage a connection between the mobile station and a network.

6. The system of claim 2, wherein the additional information comprises reauthentication identification information for the mobile station.

7. The system of claim 1, wherein the reauthentication information is embedded in an authentication response message sent from the authorization server to the security gateway.

8. The system of claim 1, wherein the reauthentication information comprises an International Mobile Subscriber Identity (IMSI).

9. An apparatus comprising:
one or more processors; and
logic encoded in one or more non-transitory tangible media for execution by the one or more processors, and when executed operable to:
receive in a security gateway, reauthentication information from an authentication server that performed an initial authentication of a mobile station, wherein the initial authentication is performed using an A3/A8 algorithm routine;
store the reauthentication information on the security gateway, wherein the security gateway is adapted to manage an encrypted connection between the mobile station and a network, wherein the reauthentication information comprises an authorization key, an encryption key, a master key, pseudo International Mobile Scriber Identity (IMSI) information, and an authorization counter, which is configured for identifying an upper limit of successive attempts by the mobile station to employ fast reauthentication within a predetermined time interval, and wherein the security gateway comprises a cache memory for storing the reauthentication information; and
access the reauthentication information to perform a subsequent fast reauthentication of the mobile station in response to a request via an Internet protocol security (IPSec) tunnel, wherein the fast reauthentication is performed by the security gateway without communicating with the authentication server and without using the A3/A8 algorithm routine.

10. The apparatus of claim 9, wherein the authentication server comprises an Authentication, Authorization, and Accounting (AAA) server.

11. The apparatus of claim 9, wherein the reauthentication information comprises information identifying services that the mobile station is subscribed to or otherwise authorized to access.

12. The apparatus of claim 9, wherein the reauthentication information comprises an International Mobile Subscriber Identity (IMSI).

13. The apparatus of claim 9, wherein the reauthentication information includes password information.

14. The apparatus of claim 9, wherein the reauthentication information comprises all requisite keys and numbers for implementing the fast reauthentication for the mobile station.

15. A method comprising:
    receiving in a security gateway, reauthentication information from an authentication server that performed an initial authentication of a mobile station, wherein the initial authentication is performed using an A3/A8 algorithm routine;
    storing the reauthentication information on the security gateway, wherein the security gateway is adapted to manage an encrypted connection between the mobile station and a network, wherein the reauthentication information comprises an authorization key, an encryption key, a master key, pseudo International Mobile Scriber Identity (IMSI) information, and an authorization counter, which is configured for identifying an upper limit of successive attempts by the mobile station to employ fast reauthentication within a predetermined time interval, wherein the storing of the authentication information comprises using a cache memory on the security gateway; and
    accessing the reauthentication information to perform a subsequent fast reauthentication of the mobile station in response to a request via an Internet protocol security (IPSec) tunnel, wherein the fast reauthentication is performed by the security gateway without communicating with the authentication server and without using the A3/A8 algorithm routine.

16. The method of claim 15, wherein the authentication server comprises an Authentication, Authorization, and Accounting (AAA) server.

17. The method of claim 15, wherein the reauthentication information further comprises additional information over information used in the initial authorization.

18. The method of claim 15, wherein the reauthentication information comprises a remote authentication dial in user service (RADIUS) class attribute.

19. The method of claim 15, wherein the reauthentication information comprises identification information for the mobile station.

20. The method of claim 15, wherein the reauthentication information is embedded in an authentication response message received in the security gateway from the authorization server.

21. The method of claim 15, wherein the reauthentication information comprises an International Mobile Subscriber Identity (IMSI).

* * * * *